United States Patent [19]
Shibata

[11] Patent Number: 5,170,219
[45] Date of Patent: Dec. 8, 1992

[54] OPTICAL HETERODYNE INTERFERENCE DETECTING APPARATUS FOR MEASURING DISPLACEMENT CHARACTERISTIC OF WORKPIECE

[75] Inventor: Jun Shibata, Nagoya, Japan

[73] Assignee: Brother Kogyo Kabushiki Kaisha, Nagoya, Japan

[21] Appl. No.: 648,057

[22] Filed: Jan. 30, 1991

[30] Foreign Application Priority Data

Feb. 6, 1990 [JP] Japan .................. 2-10777[U]

[51] Int. Cl.⁵ .............................................. G01L 1/24
[52] U.S. Cl. ..................................... 356/35.5; 73/655; 73/657; 356/349
[58] Field of Search ............. 356/35.5, 349, 351, 356/345, 358, 32; 324/727; 73/567, 655, 657

[56] References Cited

U.S. PATENT DOCUMENTS

| | | | |
|---|---|---|---|
| 4,412,172 | 10/1983 | Vig ............................. | 324/727 |
| 4,432,239 | 2/1984 | Bykov ....................... | 356/35.5 |
| 4,577,131 | 3/1986 | Soobitsky ................. | 356/345 |
| 4,581,939 | 4/1986 | Takahashi ................. | 73/655 |
| 4,823,601 | 4/1989 | Barna ........................ | 73/657 |
| 4,892,406 | 1/1990 | Waters ...................... | 356/349 |
| 4,905,519 | 3/1990 | Makowsky ................ | 73/657 |
| 4,928,527 | 5/1990 | Burger et al. ............. | 73/657 |

*Primary Examiner*—Samuel A. Turner
*Assistant Examiner*—Richard E. Kurtz, II
*Attorney, Agent, or Firm*—Oliff & Berridge

[57] ABSTRACT

An optical heterodyne interference type detecting apparatus for measuring a displacement characteristic of a workpiece, including a device for applying a controlled physical quantity to the workpiece to induce a displacement of the workpiece, an optical heterodyne interference type displacement detecting device for detecting a difference in one of a frequency and a phase between a measuring light beam reflected by the portion of the workpiece and a reference light beam, and thereby detecting an amount of the displacement of the workpiece, and an arithmetic and control device for obtaining the displacement characteristic of the workpiece, based on the physical quantity and the amount of displacement detected by the displacement detecting device.

15 Claims, 5 Drawing Sheets

OPTICAL HETERODYNE INTERFERENCE DETECTING APPARATUS FOR MEASURING DISPLACEMENT CHARACTERISTIC OF WORKPIECE

BACKGROUND OF THE INVENTION

1. Field of the Invention

The present invention relates to an apparatus for measuring a displacement characteristic of a workpiece when a certain physical quantity is applied to the workpiece.

2. Discussion of the Prior Art

In some fields of technology, there is a need to measure or detect a characteristic of displacement of a given material or workpiece which occurs due to a certain physical quantity applied thereto. For instance, it is necessary to measure a hysteresis characteristic of displacement of the workpiece, or a transient response of the workpiece to the physical quantity. For inspecting the quality of a piezoelectric element, for example, it is desired to easily test or inspect the element for the hysteresis characteristic or transient response.

One conventional method for testing the piezoelectric element uses a strain gauge for detecting a variation in the amount of displacement of the element with a change in a voltage applied thereto.

However, the conventionally used strain gauge has a maximum resolution of as low as a few or several microns ($\mu$m). To induce a displacement of the piezoelectric element larger than the maximum resolution, a voltage of several tens to several thousands of volts must be applied to the element. In the case of the piezoelectric element consisting of a thin film, the film tends to easily suffer from dielectric breakdown or puncture of insulation. This makes it difficult and cumbersome to detect the displacement of the piezoelectric film.

SUMMARY OF THE INVENTION

It is therefore an object of the present invention to provide a detecting apparatus which permits easy measurement of a displacement characteristic of a workpiece.

The above object may be accomplished according to the principle of the present invention, which provides an optical heterodyne interference type detecting apparatus for measuring a displacement characteristic of a workpiece, comprising: (a) displacement generating means for applying a physical quantity to the workpiece to induce a displacement of at least a portion of the workpiece; (b) optical heterodyne interference type displacement detecting means for detecting a difference in one of a frequency and a phase between a measuring light beam reflected by the portion of the workpiece and a reference light beam, and thereby detecting an amount of the displacement of at least the portion of the workpiece; and (c) arithmetic and control means for obtaining the displacement characteristic of the workpiece, based on the physical quantity and the amount of the displacement detected by the displacement detecting means.

In the optical heterodyne interference type detecting apparatus of the present invention constructed as described above, the amount of displacement of the workpiece can be detected by the optical heterodyne interference type detecting means, with a resolution of as high as a few or several angstroms. The arithmetic and control means obtains a displacement hysteresis or other displacement characteristic of the workpiece, based on the amount of the physical quantity applied by the displacement generating means to the workpiece and the amount of displacement of the workpiece detected by the displacement detecting means. Consequently, the present detecting apparatus does not require the displacement generating means to apply a large amount of physical quantity such as a high voltage to the workpiece, which is conventionally required to induce a displacement of as large as several microns ($\mu$m) so that the displacement can be detected by the conventional detecting means such as a strain gauge. In other words, the physical quantity such as a voltage that should be applied to the workpiece can be considerably reduced, since a relatively small amount (several angstroms) of displacement of the workpiece can be detected by the optical heterodyne interference type detecting means whose resolution is as high as a few or several angstroms. Accordingly, the present apparatus permits easy and simple measurement of the displacement characteristic of the workpiece.

The physical quantity may be the level or frequency of a voltage applied to the workpiece, or an amount of heat applied to the workpiece. These voltage level or frequency may be changed as a function of time to change the amount of displacement of the workpiece. Alternatively, the amount of displacement of the workpiece may be changed changing the temperature of the workpiece, namely, by changing the amount of heat applied to the workpiece. Further, the amount of displacement of the workpiece may be changed as a function of time, even if the physical quantity is held constant. For instance, the amplitude of the periodic change in the amount of displacement of a piezoelectric element as the workpiece may be changed, more precisely, reduced as the function of a time after a constant voltage is applied to the piezoelectric element.

The displacement characteristic of the workpiece to be measured by the arithmetic and control means may be a relationship between the displacement amount of the workpiece and the physical quantity applied thereto, which physical quantity may or may not be changed (increased and/or decreased) as a function of time. The arithmetic and control means may be adapted to calculate an evaluation value for evaluating the displacement characteristic, for example, a difference between the amount of displacement of the workpiece at a given voltage applied to the workpiece while the voltage is increased in increments of a predetermined amount, and the amount of displacement of the workpiece at the same voltage while the voltage is decreased in decrements of the predetermined amount.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
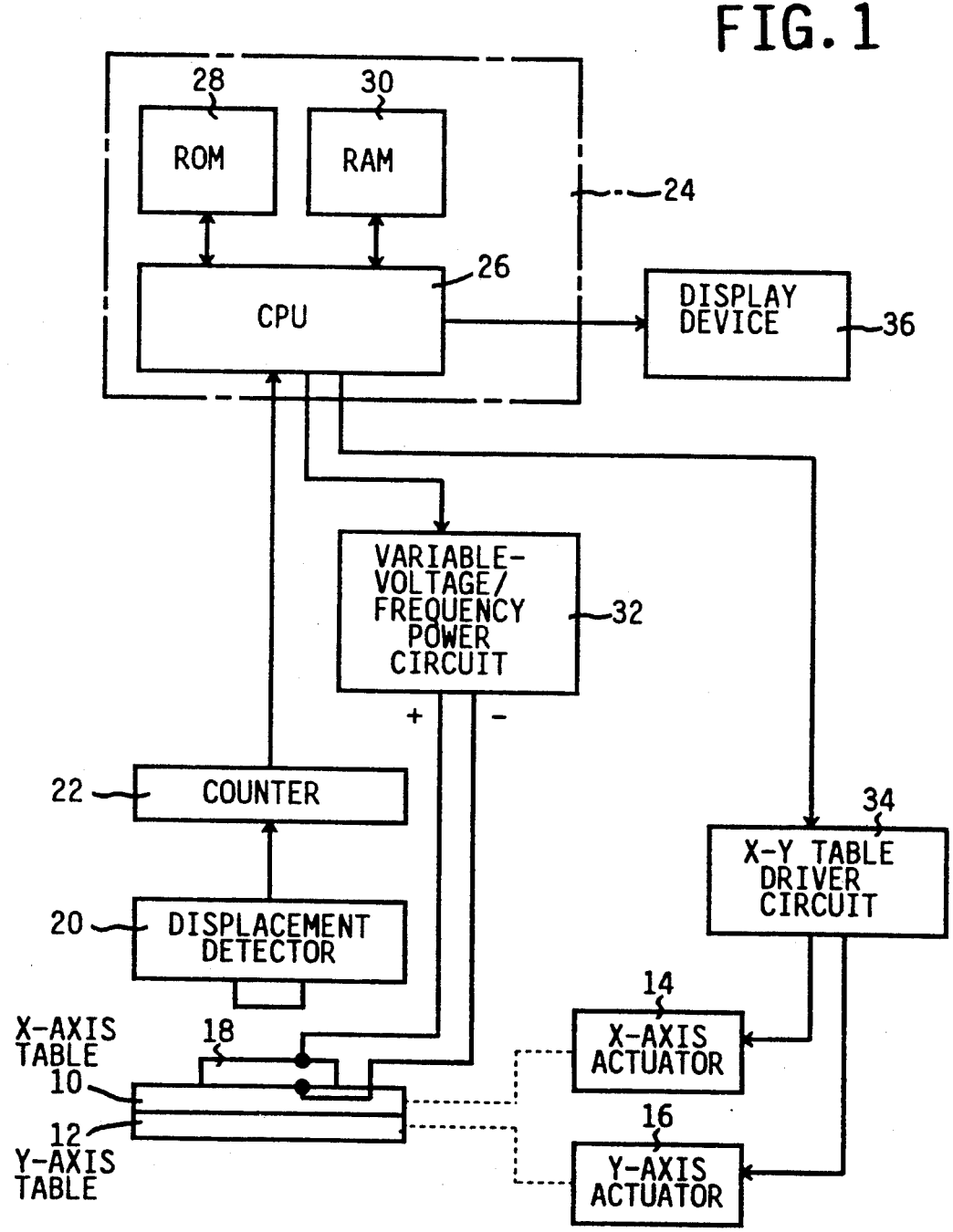
FIG. 1 is a schematic block diagram showing one embodiment of an optical heterodyne interference type detecting apparatus of the present invention.

Referring first to FIG. 1, an optical heterodyne interference type detecting apparatus has an X-axis table 10 on which a workpiece in the form of a piezoelectric element 18 is placed for measurement of displacement characteristic thereof. The X-axis table 10 is mounted on a Y-axis table 12 such that the X-axis and Y-axis tables 10, 12 are fed by respective X-axis and Y-axis actuators 14, 16 in respective X-axis and Y-axis directions parallel to X and Y axes which are perpendicular to each other.

The detecting apparatus further has an optical heterodyne interference type displacement detector 20 disposed a suitable distance above the X-axis table 10. The displacement detector 20 is adapted to measure an amount of vertical displacement of the top surface of the piezoelectric element 18, by utilizing the well known phenomenon of optical heterodyne interference. The optical heterodyne interference type displacement detector 20 includes a light source for generating a light beam to irradiate the top surface of the piezoelectric element 18, a photoelectric sensor which converts the light beam reflected from the top surface of the element 18 into an electric output, and a detecting circuit which produces an output indicative of a difference in frequency or phase between a reference beam and a measuring beam, namely, the light beam irradiating the element 18 and the light beam reflected by the element 18. The frequency or phase of the measuring light beam reflected by the element 18 is changed with respect to that of the reference beam irradiating the element 18, due to optical heterodyne interference between these two beams. The frequency or phase difference is obtained due to heterodyne interference between the reference and measuring beams, and the output indicative of this difference is applied to a counter 22 provided in the detecting apparatus. An example of the optical heterodyne interference type displacement detector 20 is disclosed in U.S. Pat. No. 4,912,530, the disclosure of which is hereby incorporated by reference. Like the detector of this patent, the detector 20 is capable of measuring an amount of displacement of the top surface of the piezoelectric element 18, with a resolution of a few or several angstroms, based on the frequency or phase difference between the reference and measuring light beams. The detector 20 may be a double-heterodyne interference type.

The counter 22 is adapted to count an amount of the frequency or phase difference indicated above, and applies an output indicative of the count to an electronic control device 24. The count of the counter 22 represents the amount of vertical displacement of the piezoelectric element 18 at its top or upper surface.

The electronic control device 24 is a so-called microcomputer which incorporates a central processing unit (CPU) 26, a read-only memory (ROM) 28 and a random-access memory (RAM) 28. The CPU 26 operates to process input signals according to a control program stored in the ROM 28, while utilizing a temporary data storage function of the RAM 30, so that the CPU 26 controls a variable-voltage/frequency power circuit 32 for controlling a voltage applied to the piezoelectric element 18, or a frequency of a constant voltage applied to the element 18. The CPU 26 also controls an X-Y table driver circuit 34 for positioning the X-axis and Y-axis tables 10, 12. In the present embodiment, the variable-voltage/frequency power circuit 32 functions as a power circuit for driving the piezoelectric element 18 with a controlled voltage determined by a command from the electronic control device 24. The X-Y table driver circuit 34 is adapted to drive the X-axis and Y-axis table driver actuators 14, 16 for moving the tables 10, 12 to locate the piezoelectric element 18 at a position determined by a command from the electronic control device 24.

The present detecting apparatus is equipped with a display device 36, which is controlled by the electronic control device 24.

Figure 2:
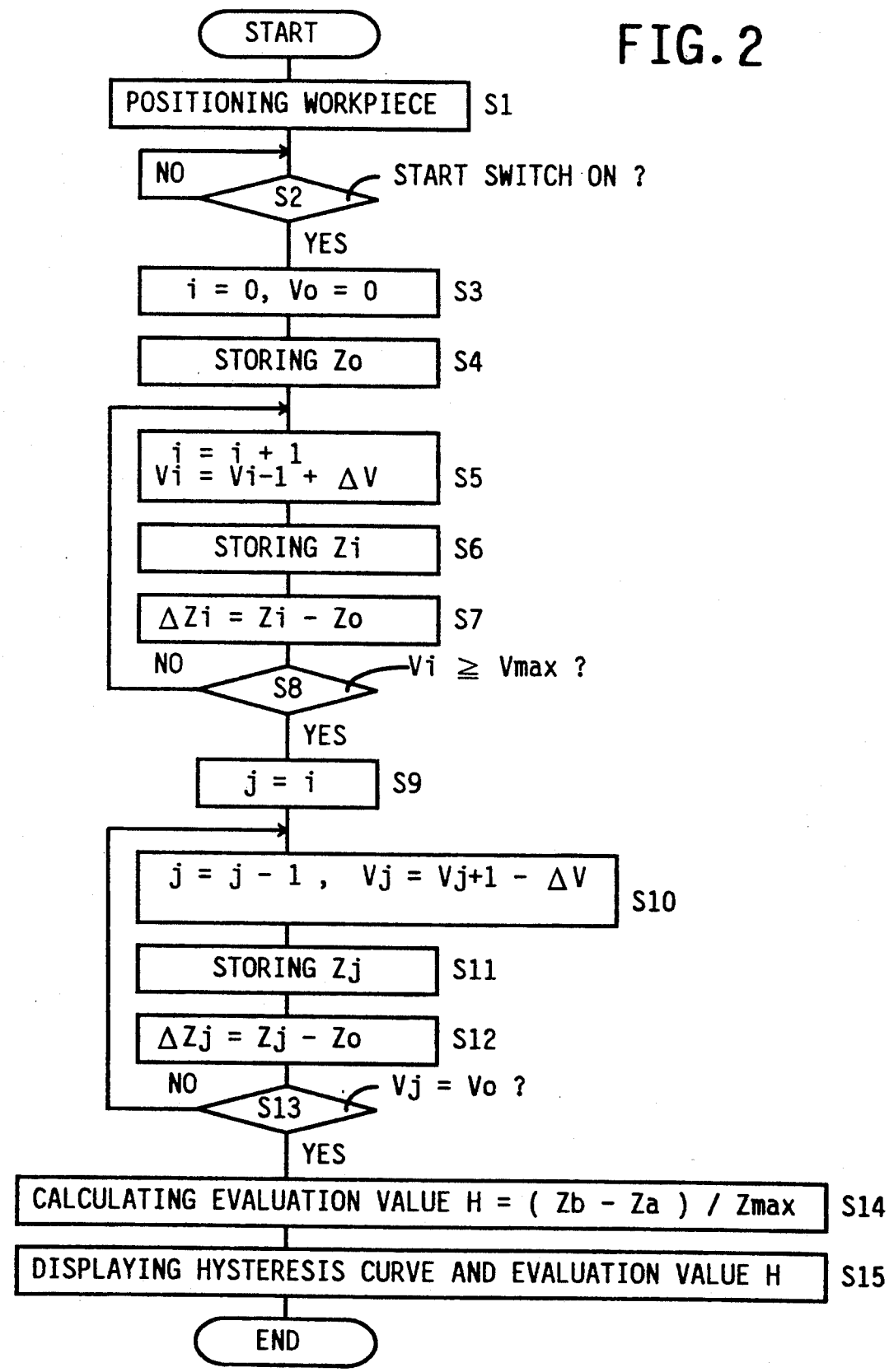
FIG. 2 is a flow chart illustrating an operation of the detector of FIG. 1.

Referring next to the flow chart of FIG. 2, an operation of the electronic control device 24 will be described.

Initially, step S1 is executed to position the X-axis and Y-axis tables 10, 12 so that the piezoelectric element 18 on the X-axis table 10 is located right below the displacement detector 20. Step S1 is followed by step S2 to determine whether a start switch provided to start a displacement detecting operation is ON or not. Step S2 is repeatedly executed until an affirmative decision (YES) is obtained. If an affirmative decision (YES) is obtained, the control flow goes to step S3 to reset a displacement data number "i" used for displacement measurement of the element 18 by increasing a voltage Vi applied thereto, and set the voltage Vi to a predetermined initial value Vo, which is equal to "0" in this embodiment. In step S3, therefore, no voltage is applied to the piezoelectric element 18. Step S4 is then executed to store in the RAM 30 height data indicative of an initial height Zo (Z-axis coordinate) of the top surface of the element 18 when the voltage Vi is equal to Vo.

The control flow then goes to step S5 to increment the displacement data number "i", and increase the voltage Vi by a predetermined amount $\Delta V$. That is, the voltage Vi to be applied to the element 18 in step S5 is determined by adding the predetermined increment $\Delta V$ to the voltage $Vi-1$ applied in the last cycle. Thus, the voltage Vi is applied to the element 18 in step S5. Step S6 is then executed to store in the RAM 30 height data indicative of a height Zi of the element 18 with the voltage Vi applied thereto. Step S6 is followed by step S7 to calculate an amount of displacement $\Delta Zi$ by subtracting the initial height Zo from the height Zi newly stored in step S6. The displacement amount $\Delta Zi$ is stored in the RAM 30. Step S7 is followed by step S8 to determine whether or not the voltage Vi has reached a maximum value Vmax, i.e., whether the voltage currently applied to the element 18 is equal to or higher than the maximum value Vmax.

Figure 3:
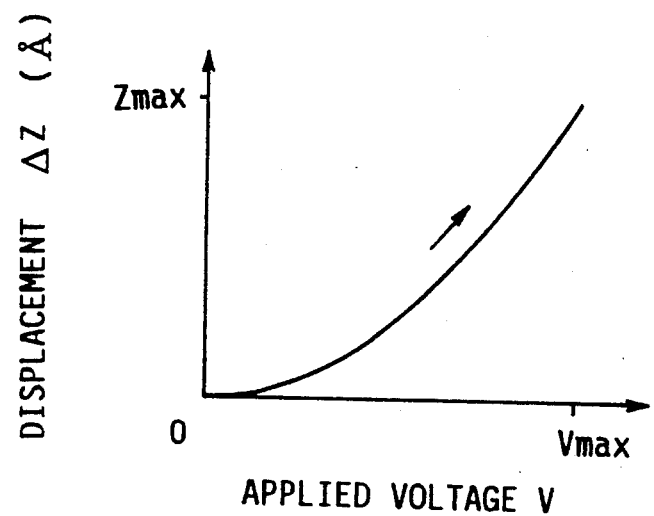
FIG. 3 is a graph indicating a relationship between a displacement amount of a workpiece and a voltage applied to the workpiece, which relationship is obtained by repetitive execution of steps S5 through S8 of the flow chart of FIG. 2.

Steps S5 through S8 are repeatedly executed until an affirmative decision (YES) is obtained in step S8, namely, until the voltage Vi has reached or exceeded the maximum value Vmax. When the affirmative decision (YES) is obtained in step S8, the control flow goes to step S9. A variation in the displacement amount $\Delta Z$ of the piezoelectric element 18 with an increase in the voltage V is indicated in the graph of FIG. 3.

In step S9, a displacement data number "j" for displacement measurement of the element 18 by decreasing the voltage V is set to be equal to "i" used in the last execution of step S5. Step S9 is followed by step S10 to decrement the displacement data number "j", and decrease the voltage Vj by the predetermined amount $\Delta V$. That is, the voltage Vj to be applied to the element 18 in step S10 is determined by subtracting the predetermined increment $\Delta V$ from the voltage Vj+1 applied in the last cycle. When step S10 is executed for the first time, the voltage Vj+1 is equal to the voltage Vi (used in the last execution of step S5) which is equal to higher than Vmax. The thus determined voltage Vj is applied to the element 18 in step S10. Step S11 is then executed to store in the RAM 30 height data indicative of a height Zj of the element 18 with the voltage Vj applied thereto. Step S11 is followed by step S12 to calculate an amount of displacement $\Delta Zj$ by subtracting the initial height Zo from the height Zj newly stored in step S11. The displacement amount $\Delta Zj$ is stored in the RAM 30. Step S12 is followed by step S13 to determine whether the voltage Zj has been lowered to the initial voltage Vo.

Figure 4:
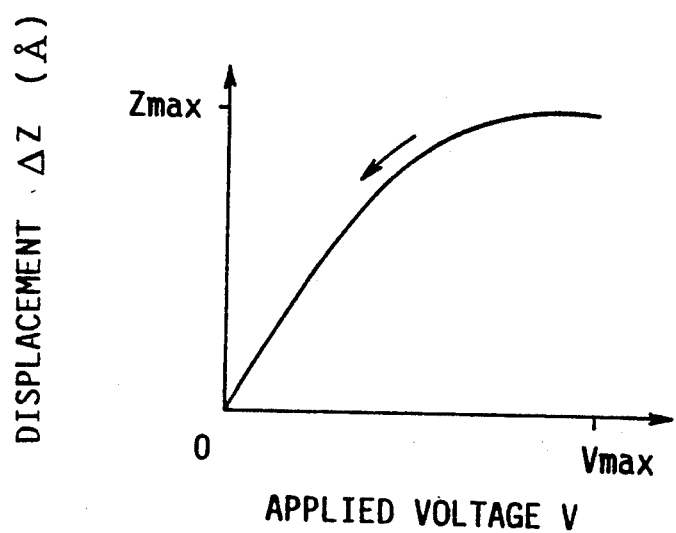
FIG. 4 is a graph indicating a relationship between the workpiece displacement amount and the applied voltage, which is obtained by repetitive execution of steps S10 through S13 of the flow chart of FIG. 2.

Steps S10 through S13 are repeatedly executed until an affirmative decision (YES) is obtained. When the affirmative decision (YES) is obtained in step S13, the control flow goes to step S14. A variation in the displacement amount $\Delta Z$ with a decrease in the voltage V is indicated in the graph of FIG. 4.

Step S14 is implemented to determine a displacement amount Za of the element 18 which was measured at the voltage Vmax/2 during the measurement by increasing the voltage Vi, and a displacement amount Zb of the element 18 which was measured at the voltage Vmax/2 during the measurement by decreasing the voltage Vj. In the same step S14, an evaluation value "H" is calculated according to the following equation (1):

$$H = (Zb - Za)/Zmax \quad (1)$$

Figure 5:
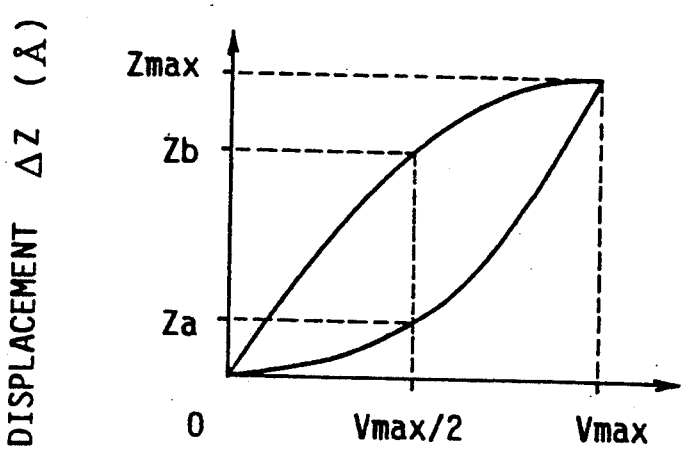
FIG. 5 is a graph indicating a hysteresis of the workpiece which is obtained as a result of a measurement according to the flow chart of FIG. 2.

Then, the control flow goes to step S15 to display the calculated evaluation value H, and hysteresis curves as shown in FIG. 5, based on batches of the displacement data (relationships between Vi and $\Delta Zi$, and between Vj and $\Delta Zj$) stored in steps S7 and S12 in the RAM 30.

In the present optical heterodyne type displacement detecting apparatus, the variable-voltage/frequency power circuit 32 serves as means for generating the displacement AZ of the piezoelectric element 18 by applying thereto a physical quantity in the form of the voltage V changed as a function of time, and the optical heterodyne interference type displacement detector 20 serves as means for detecting the displacement $\Delta Z$, with a resolution of a few or several angstroms. Further, the electronic control device 24 serves as arithmetic and control means for obtaining a displacement characteristic of the piezoelectric element 18, i.e., evaluation value H and the displacement hysteresis of the element 18, based on the voltage V and the displacement $\Delta Z$. Namely, the control device 24 provides a relationship between the displacement amount $\Delta Z$ of the element 18 and the voltage V applied to the element 18, which relationship is obtained while the voltage V is increased and decreased over a suitable range. This arrangement does not require the piezoelectric element 18 to be energized by an extremely high voltage enough to induce a displacement of the element 18 by several microns. In other words, the physical quantity in the form of the voltage V applied to the element 18 may be made considerably small, as long as the voltage V causes the displacement of the element 18 exceeding the resolving power of a few or several angstroms of the displacement detector 20. Accordingly, the present detecting apparatus permits easy and simple measurement of the displacement characteristic or hysteresis of the element 18 as the workpiece.

Referring to FIGS. 6–9 other embodiments of the present invention will be described.

Figure 6:
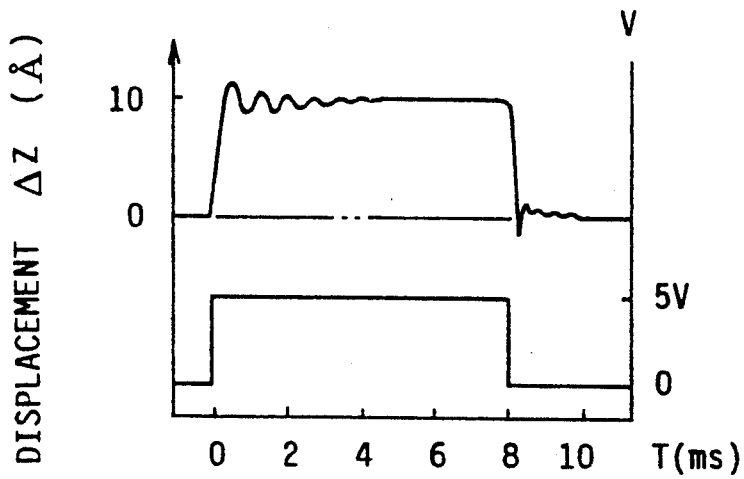
FIG. 6 is a graph showing a transient variation in the displacement amount of the workpiece when a constant voltage is applied to the workpiece, according to another embodiment of the present invention.

In the first modified embodiment of FIG. 6, the variable-voltage/frequency power circuit 32 is controlled by the electronic control device 24, to apply a predetermined constant voltage, for example, 5 V, to the piezoelectric element 18 for a predetermined length of time, for example, eight ms., as indicated in FIG. 6. In this case, the amount of displacement $\Delta Z$ of the piezoelectric element 18 periodically changes or oscillates for an initial period of the duration of the voltage application, as indicated in FIG. 6. The length of time of the periodic change of the displacement amount of the element 18, namely, the displacement settling time or damping index of the element 18 is determined according to a predetermined equation stored in the ROM 28, and the determined settling time or damping index is indicated on the display device 36.

Figure 7:
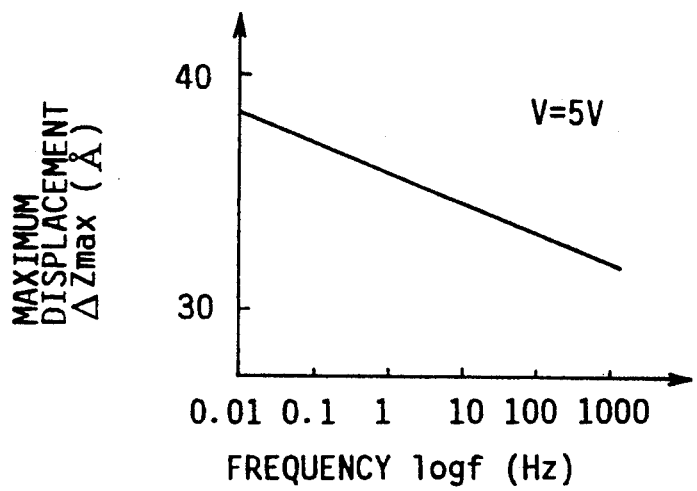
FIG. 7 is a graph indicating a relationship between a maximum amount of displacement of the workpiece and a frequency of a voltage signal applied to the workpiece, in a further embodiment of FIG. 6.

In the second modified embodiment of FIG. 7, the variable-voltage/frequency power circuit 32 is controlled by the electronic control device 24, to apply a predetermined constant voltage, for example, 5 V, to the piezoelectric element 18, with a controlled frequency of the voltage signal. In this embodiment, the frequency of the voltage signal is changed in increments of a predetermined amount $\Delta f$, rather than the voltage V is changed in increments of $\Delta V$ as in the first embodiment. The graph of FIG. 7 indicates a relationship between the maximum amount $\Delta Zmax$ of displacement of the piezoelectric element 18 and the voltage signal frequency log. f (Hz).

Figure 9:
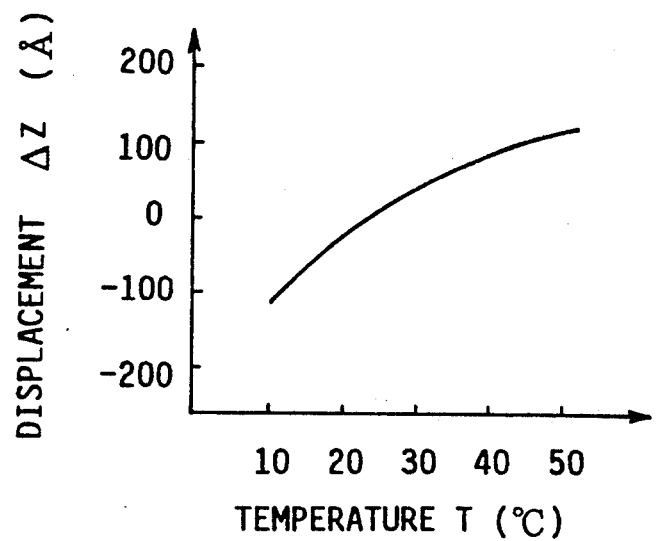
FIG. 9 is a graph indicating a relationship between the displacement amount and a temperature of the workpiece, which is obtained in the embodiment of FIG. 8.
Figure 8:
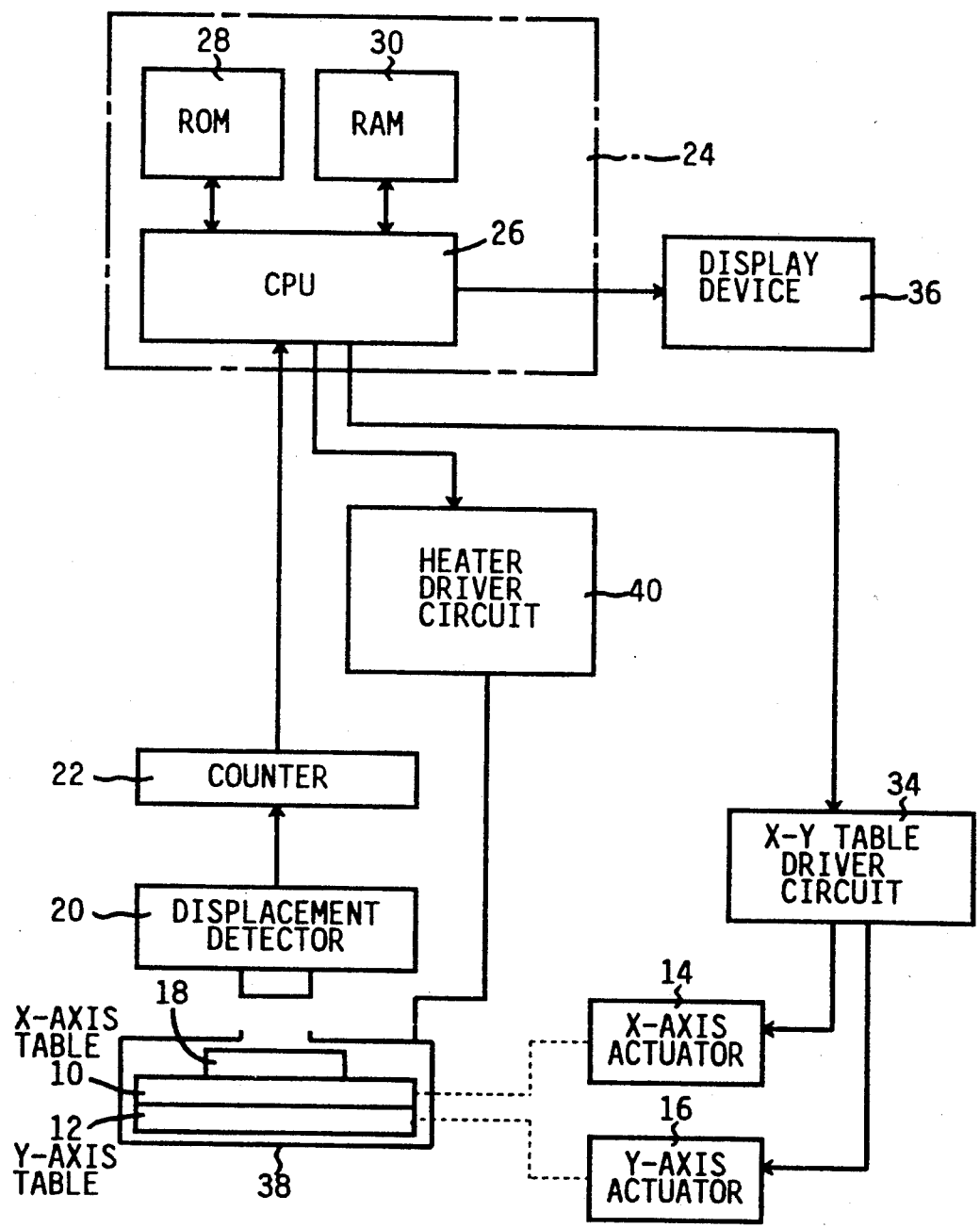
FIG. 8 is a diagram corresponding to that of FIG. 1, showing a still further embodiment of this invention.

In the embodiment of FIGS. 8 and 9, the X-axis and Y-axis tables 10, 12 are accommodated within a heating bath 38 equipped with a heater for applying heat to the piezoelectric element 18 to change the temperature of the element 18. The heater is energized by a controlled voltage supplied from a heater driver circuit 40. The heater driver circuit 40 is controlled by the electronic control device 24, so that the temperature of the element 18 is changed in increments of a predetermined amount $\Delta T$, in steps corresponding to steps S5 and S10 of the flow chart of FIG. 2 of the first embodiment (in which the voltage V is incremented and decremented). The graph of FIG. 9 indicates a relationship between the displacement amount ΔZ and the temperature T (°C.) of the piezoelectric element 18.

While the present invention has been described in its presently preferred embodiments with certain degrees of particularity, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. An optical heterodyne interference type detecting apparatus for measuring a displacement characteristic of a workpiece, comprising:

displacement generating means for applying a physical quantity to said workpiece to induce a displacement of at least a portion of said workpiece, such that said physical quantity is changed as a function of time to thereby change an amount of displacement of said portion of said workpiece;

optical heterodyne interference type displacement detecting means for detecting a difference in one of a frequency and a phase between a measuring light beam reflected by said portion of said workpiece and a reference light beam, and thereby detecting the amount of said displacement of at least said portion of said workpiece;

displacement storing means for storing displacement data representative of said amount of said displacement, in relation to said physical quantity changed by said displacement generating means; and arithmetic and control means for obtaining said displacement characteristic of the workpiece, based on said displacement data representative of said amount of said displacement stored in said displacement storing means in relation to said physical quantity.

2. An optical heterodyne interference type detecting apparatus according to claim 1, wherein said physical quantity is a level of a voltage applied to said workpiece.

3. An optical heterodyne interference type detecting apparatus according to claim 2, wherein said displacement generating means includes means for increasing the level of said voltage from a predetermined initial value to a predetermined maximum value, and decreasing said level from said maximum value to said initial value, said displacement detecting means detecting a first variation in said amount of displacement when the level of said voltage is increased, and a second variation in said amount of displacement when the level of said voltage is decreased, said displacement data storing means storing said first variation in relation to an increase in the level of said voltage, and said second variation in relation to a decrease in the level of said voltage.

4. An optical heterodyne interference type detecting apparatus according to claim 3, wherein said arithmetic and control means obtains, based on said first variation, a first relationship between said amount of displacement and the level of said voltage when said level of the voltage is increased, and obtains, based on said second variation, a second relationship between said amount of displacement and the level of said voltage when said level of the voltage is decreased.

5. An optical heterodyne interference type detecting apparatus according to claim 3, wherein said arithmetic and control means obtains an evaluation value which is a difference between amounts of displacement of said workpiece which are detected by said displacement detecting means at a same level of said voltage and stored in said displacement storing means while said level of the voltage is increased and decreased.

6. An optical heterodyne interference type detecting apparatus according to claim 1, wherein said physical quantity is a frequency of a voltage applied to said workpiece.

7. An optical heterodyne interference type detecting apparatus according to claim 6, wherein said displacement generating means includes means for changing said frequency of said voltage as a function of time, and said displacement detecting means detects a variation in a maximum amount of displacement of at least said portion of said workpiece when said frequency is changed, said displacement storing means storing said variation in the maximum amount of displacement in relation to a change in said frequency.

8. An optical heterodyne interference type detecting apparatus according to claim 1, wherein said physical quantity is an amount of heat applied to at least said portion of said workpiece.

9. An optical heterodyne interference type detecting apparatus according to claim 8, wherein said displacement generating means includes a heater for changing said amount of heat applied to said portion of the workpiece to thereby change a temperature of said portion of the workpiece as a function of time, said displacement detecting means detecting a variation in said amount of displacement when said amount of heat is changed, said displacement storing means storing said amount of displacement in relation to a variation in said temperature.

10. An optical heterodyne interference type detecting apparatus according to claim 1, wherein said workpiece consists of a piezoelectric element.

11. An optical heterodyne interference type detecting apparatus according to claim 10, wherein said displacement of at least said portion of the workpiece occurs in a direction parallel to an optical path of said displacement detecting means along which said measuring light beam travels.

12. An optical heterodyne interference type detecting apparatus according to claim 11, further comprising a table on which said piezoelectric element is placed, said displacement detecting means irradiates a top surface of said piezoelectric element with said reference light beam, and receives as said measuring light beam said reference light beam reflected by said top surface.

13. An optical heterodyne interference type detecting apparatus according to claim 12, further comprising means for moving said table for positioning said piezoelectric element relative to said displacement detecting means.

14. An optical heterodyne interference type detecting apparatus according to claim 1, further comprising a display device for indicating said displacement characteristic of said workpiece.

15. An optical heterodyne interference type detecting apparatus for measuring a displacement characteristic of a workpiece, comprising:

displacement generating means for applying a predetermined constant voltage to said workpiece for a predetermined time, to induce a displacement of at least a portion of said workpiece;

optical heterodyne interference type displacement detecting means for detecting a difference in one of a frequency and a phase between a measuring light beam reflected by said portion of said workpiece and a reference light beam, and thereby detecting a variation in an amount of said displacement of at least said portion of said workpiece for said predetermined time;

displacement storing means for storing displacement data representative of said amount of said displacement as a function of time; and arithmetic and control means for obtaining an initial period of said predetermined time during which a periodic change of said amount of displacement occurs, based on said displacement data representative of said amount of said displacement stored in said displacement storing means in relation to the time, and according to a predetermined equation.

* * * * *